US008917056B2

(12) United States Patent
Jung

(10) Patent No.: US 8,917,056 B2
(45) Date of Patent: Dec. 23, 2014

(54) CHARGING APPARATUS FOR ELECTRIC VEHICLE

(75) Inventor: Yeon-Sung Jung, Yongin-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 346 days.

(21) Appl. No.: 13/242,424

(22) Filed: Sep. 23, 2011

(65) Prior Publication Data

US 2012/0280649 A1 Nov. 8, 2012

(30) Foreign Application Priority Data

May 4, 2011 (KR) .................. 10-2011-0042687

(51) Int. Cl.
*H02J 7/00* (2006.01)
*B60K 6/20* (2007.10)
*H02J 5/00* (2006.01)
*H02J 7/02* (2006.01)
*B60L 11/18* (2006.01)

(52) U.S. Cl.
CPC ........... *B60L 11/182* (2013.01); *B60L 11/1833* (2013.01); *Y02T 10/7005* (2013.01); *Y02T 90/122* (2013.01); *Y02T 90/12* (2013.01); *Y02T 90/125* (2013.01); *Y02T 90/14* (2013.01); *Y02T 10/7088* (2013.01); *H02J 5/005* (2013.01); *H02J 7/025* (2013.01)
USPC .......................... 320/108; 320/109; 180/65.21

(58) Field of Classification Search
CPC ....................................... H02J 7/025
USPC ................................. 320/108, 109
See application file for complete search history.

(56) References Cited

U.S. PATENT DOCUMENTS

| 4,800,328 | A | | 1/1989 | Bolger et al. |
|---|---|---|---|---|
| 5,617,003 | A | | 4/1997 | Odachi et al. |
| 5,703,461 | A | | 12/1997 | Minoshima et al. |
| 5,821,731 | A | * | 10/1998 | Kuki et al. .................. 320/108 |
| 2010/0065352 | A1 | | 3/2010 | Ichikawa |
| 2011/0181240 | A1 | * | 7/2011 | Baarman et al. ............... 320/108 |
| 2011/0254504 | A1 | * | 10/2011 | Haddad et al. ................ 320/109 |
| 2012/0161696 | A1 | * | 6/2012 | Cook et al. .................... 320/108 |

FOREIGN PATENT DOCUMENTS

| JP | 09-213378 A | 8/1997 |
|---|---|---|
| JP | 11-127503 A | 5/1999 |
| JP | 2011063944 | 3/2011 |

(Continued)

OTHER PUBLICATIONS

Korean Office Action issued Aug. 30, 2012 in connection with Korean Patent Application Serial No. 10-2011-0042687 and Request for Entry of the Accompanying Office Action attached herewith.

(Continued)

*Primary Examiner* — Edward Tso
*Assistant Examiner* — Ahmed Omar
(74) *Attorney, Agent, or Firm* — Robert E. Bushnell, Esq.

(57) ABSTRACT

An electric vehicle charging apparatus. The electric vehicle charging apparatus includes an electric vehicle including a vehicle coil connected to a charging circuit connected to a storage battery, a parking stop arranged on a parking lot surface, a stop coil arranged within the parking stop to generate an induced current in the vehicle coil when the vehicle coil is arranged in a vicinity of the stop coil and an operation unit connected to the stop coil to raise the stop coil.

7 Claims, 11 Drawing Sheets

(56) References Cited

FOREIGN PATENT DOCUMENTS

| | | |
|---|---|---|
| KR | 1999-0066266 A | 8/1999 |
| KR | 10-2010-0022568 A | 3/2010 |
| KR | 1020100071026 | 6/2010 |

OTHER PUBLICATIONS

"Parking Stops," Parking Stops, Car Stop in Stock.
"Parking Stops," The Park and Facilities Catalog. The Park Catalog, 2001-2013.

* cited by examiner

CHARGING APPARATUS FOR ELECTRIC VEHICLE

CLAIM OF PRIORITY

This application makes reference to, incorporates the same herein, and claims all benefits accruing under 35 U.S.C. §119 from an application for CHARGING APPARATUS FOR ELECTRIC VEHICLE earlier filed in the Korean Intellectual Property Office on 4 May 2011 and there duly assigned Korean Patent Application No. 10-2011-0042687.

BACKGROUND OF THE INVENTION

1. Field of the Invention

The described technology relates generally to a charging apparatus that can accurately charge an electric vehicle via a non-contact method.

2. Description of the Related Art

When charging an electric vehicle, a contact type charging method and a non-contact type charging method can be used. In the contact type charging method of the electric vehicle, when a connector is installed on a vehicle body, a passenger gets out of the vehicle, a charge code is connected to the connector of a vehicle body, and charging of the is electric vehicle is performed. However, there is a problem that such a contact type charging method is a complicated charging process, and danger of an electric shock remains present.

Further, in a non-contact charging method of an electric vehicle, a driver needs to accurately park the electric vehicle at a location at which a charging apparatus is installed. As a result, there is a problem in that the electric vehicle may not always be accurately connected to the charging apparatus due to a driver's driving ability. Consequently, what is needed is a new non-contacting charging apparatus that can overcome or avoid the problems of an inaccurately parked electric vehicle.

The above information disclosed in this Background section is only for enhancement of understanding of the background of the described technology and therefore it may contain information that does not constitute prior art as per 35 U.S.C. §102.

SUMMARY OF THE INVENTION

The described technology has been made in an effort to provide a non-contact electric vehicle charging apparatus having advantages of enabling to more smoothly perform non-contact charging of an electric vehicle.

An exemplary embodiment provides an electric vehicle charging apparatus to recharge an electric vehicle having a vehicle coil connected to a charging circuit connected to a storage battery, the electric vehicle charging apparatus including a parking stop arranged on a parking lot surface, a stop coil arranged within the parking stop to generate an induced current in the vehicle coil when the vehicle coil is arranged in a vicinity of the stop coil and an operation unit connected to the stop coil to raise the stop coil.

The operation unit may be a first cylinder member that is arranged within the parking stop. The operation unit may instead include a first rack gear arranged within the parking stop to raise the stop coil above the parking stop and to lower the stop coil back within the parking stop, a first pinion gear that engages with the first rack gear, a second pinion gear that rotates together with the first pinion gear and a second rack gear adapted to move horizontally upon application of force, adapted to protrude from a side of the parking stop and capable of being forced within the parking stop, the second rack gear being engaged with the second pinion gear.

The electric vehicle charging apparatus may also include a sensing unit that senses whether the electric vehicle is parked at a proper location for charging. The sensing unit may be a limit switch that is installed on the parking stop to sense whether a tire of the electric vehicle forms contact therewith. The sensing unit may instead be a load sensor that is installed on a surface of the parking lot at a location in a vicinity of the parking stop to sense a wheel load of the electric vehicle.

The electric vehicle charging apparatus may also include a vehicle type sensor that senses a vehicle type of the electric vehicle entering into the parking lot. The vehicle type sensor may include a Radio-Frequency IDentification (RFID) tag that is installed on the electric vehicle to transmit vehicle information and an RFID reader that is installed in the parking lot to receive a signal from the RFID tag that includes vehicle information of the electric vehicle.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Hereinafter, an electric vehicle charging apparatus according to exemplary embodiments of the present invention will be described in detail with reference to the attached drawings. The present invention is not limited to the exemplary embodiments, but may be embodied in various forms, and exemplary embodiments of the present invention will be described in detail with reference to the attached drawings such that the present invention can be easily put into practice by those skilled in the art.

Figure 1:
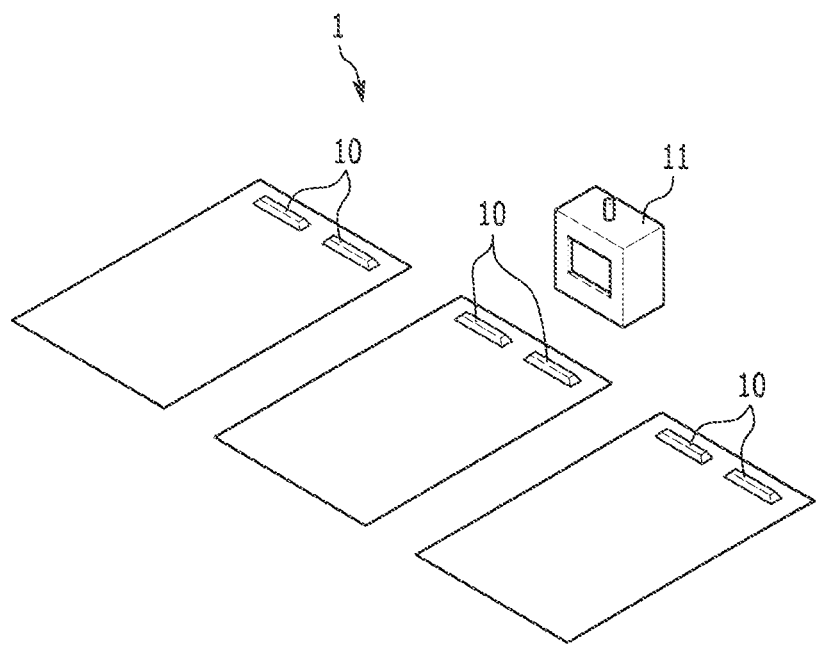
FIG. 1 is a perspective view illustrating a parking lot in which an electric vehicle charging apparatus is installed according to a first exemplary embodiment of the present invention.

Turning now to FIG. 1, FIG. 1 is a perspective view illustrating a parking lot in which an electric vehicle charging apparatus is installed according to a first exemplary embodiment of the present invention. As shown in FIG. 1, at an electric vehicle parking lot 1 where both parking and then charging of an electric vehicle take place, a plurality of parking stops 10 that perform charging while guiding an electric vehicle 3 entering into a parking space in parking lot 1 are installed. FIG. 1 illustrates two stops 10 per parking space, however, the present invention can be modified so that there is just one long stop for each parking space.

A stop coil 20 to be described later is installed within each parking stop 10, and a vehicle coil 30 to be described later is installed within the electric vehicle 3, and thus the electric vehicle 3 can be charged by an electromagnetic induction technique. The electromagnetic induction technique pertains to an inductive coupling where current is induced in a vehicle coil by flowing a current through a stop coil arranged in a vicinity of the vehicle coil. Hereinafter, this will be described in detail with reference to FIG. 3.

A control unit 11 including an external power source device for charging is installed at a parking lot, and thus the control unit 11 supplies a current to the stop coil 20, thereby controlling the charging process of the electric vehicle 3.

Figure 2:
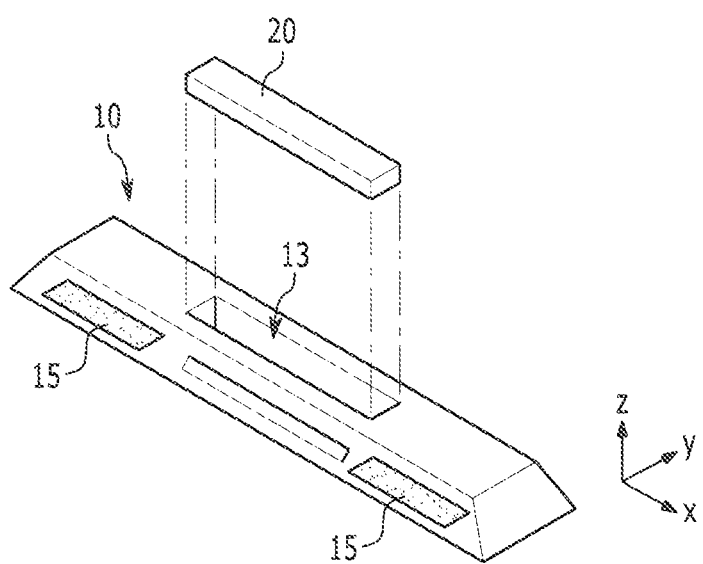
FIG. 2 is a perspective view illustrating a parking stop that is installed in a parking lot for charging an electric vehicle according to a first exemplary embodiment of the present invention.

Turning now to FIG. 2, FIG. 2 is a perspective view illustrating a parking stop that is installed at a parking lot for charging an electric vehicle. As shown in FIG. 2, the parking stop 10 is arranged on and protrudes from the surface of a parking lot. The electric vehicle 3 and each parking space have a long length in the y-axis direction and the electric vehicle and each parking space has a width that extends in the x-axis direction. Further, an inclined surface is formed on a side surface of each parking stop 10, and thus the inclined surface allows tires 3b of each wheel 3a of the electric vehicle 3 to more smoothly contact and rest against the parking stop 10.

Each parking stop 10 has a trapezoidal cross-sectional shape in a direction orthogonal to a length direction of the stopper 10. Further, an installation space 13 is formed on the inside of a top surface of each parking stop 10 and extends in a length direction of each parking stop, and the stop coil 20 to be described later is installed within the installation space 13. This will be described in detail while describing the stop coil 20.

In the present exemplary embodiment, each parking stop 10 has an inclined surface on both side surfaces of a length direction thereof. However, an inclined surface is not limited to being formed on both side surfaces of a length direction of the parking stop 10, but may instead be formed only on a surface directly contacting with a tire 3b of a wheel 3a.

In order to contact the parking stop 10 with a tire of a rear wheel or a front wheel, a pair of parking stops 10 is installed in each parking space for each electric vehicle. Therefore, when parking several electric vehicles in a parking lot, a pair of parking stops 10 is installed in each parking space.

A height of each parking stop 10 can be equal to or less than a radius of wheel 3a. This is to prevent the parking stop 10 from interfering with a vehicle body of the electric vehicle 3 while allowing the electric vehicle 3 to smoothly park within a parking space. The parking stop 10 can be made out of urethane, plastic or a material of a stop that is generally used in the parking lot. A material for the parking stop 10 is well-known and is not limited to a urethane or plastic material and may be a material that is deformable or may be any of various materials having appropriate strength.

When charging the electric vehicle 3 at night, in order to easily locate a parking space, a reflection member 15 may be installed on each parking stop 10. That is, the reflection member 15 reflects light that is emitted from a head lamp or a rear lamp of the electric vehicle 3, thereby guiding a driver to park the electric vehicle 3 at a proper location.

The reflection member 15 may be a film type sticker that is mounted on the parking stops 10. When a separate lighting member (not shown) is present in the parking lot 1, the reflection member 15 may be omitted. The parking stop 10 of the present exemplary embodiment can be used in both indoor parking lots and in outdoor parking lots.

Figure 3:
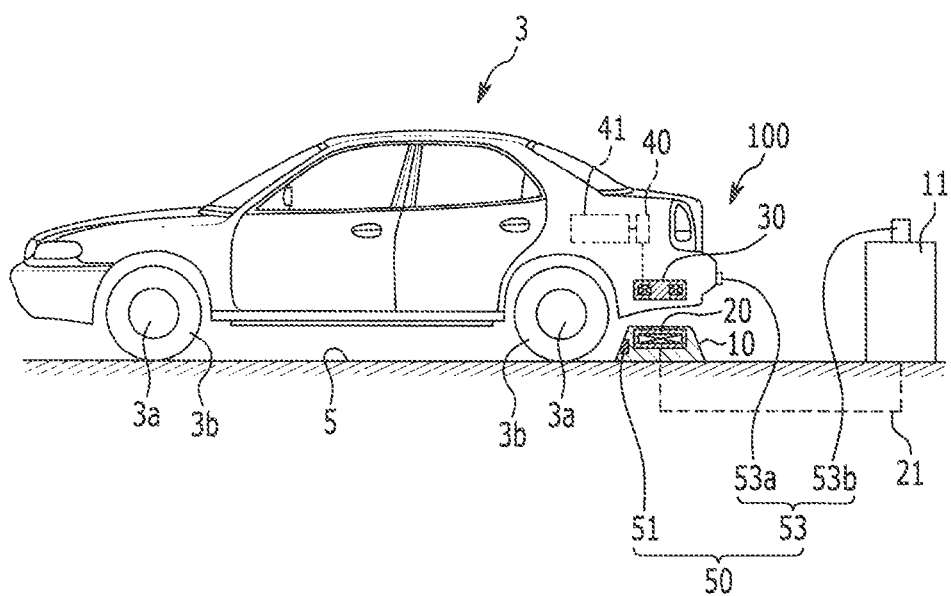
FIG. 3 is a side view illustrating an electric vehicle charging apparatus before a wheel of an electric vehicle contacts a parking stop in the parking lot of FIG. 1.

Turning now to FIG. 3, FIG. 3 is a side view illustrating an electric vehicle charging apparatus before the tires 3b of the electric vehicle 3 come into contact with any of the parking stops 10 in the parking lot of FIG. 1. As shown in FIG. 3, an electric vehicle charging apparatus 100 according to a first exemplary embodiment of the present invention includes a stop coil 20 that is installed within each parking stop 10, each parking stop is arranged on and protrudes from the surface of the parking lot 1, a vehicle coil 30 that is installed within the electric vehicle 3, the vehicle coil 30 being connected to a storage battery 41 for vehicle power. Vehicle coil 30 generates an induction current between the stop coil 20 and the vehicle coil 30. The charging apparatus also includes a charging circuit 40 arranged within the electric vehicle 3 that charges the storage battery 41 using an induction current that is generated in the vehicle coil 30.

Each stop coil 20 is installed within an installation space 13 that is arranged within each parking stop 10 and performs an electromagnetic induction process together with the vehicle coil 30 when the electric vehicle 3 is properly parked, which will be described later.

The stop coil 20 has a flat plate shape and is arranged on the inside of the parking stop 10. In more detail, the stop coil 20 is installed in a form that winds an electric wire along the circumference of a flat ferrite material. The stop coil 20 performs an electromagnetic induction technique for charging the electric vehicle 3 together with the vehicle coil 30 to be described later.

The stop coil 20 is connected to the control unit 11 that includes an external power source device that is installed in the parking lot 1. For this purpose, below a surface 5 of the parking lot 1, an electric wire 21 electrically connects each stop coil 20 to the control unit 11 that is connected to the external power source device.

The vehicle coil 30 is installed at a location adjacent to the wheel 3a and on the inside of the electric vehicle 3. Alternatively, a portion of the vehicle coil 30 may be exposed to the outside of the electric vehicle 3. In this case, a cover member (not shown) that selectively opens and closes the vehicle coil 30 is installed on a vehicle body of the electric vehicle 3, and thus the vehicle coil 30 can be selectively exposed.

As with the stop coil 20, the vehicle coil 30 is installed in a form that winds an electric wire around the circumference of a ferrite material.

In the present exemplary embodiment, the vehicle coil 30 is installed at a location adjacent to a rear wheel. That is, the electric vehicle 3 is parked at the parking stops 10 by reversing or backing in. This allows the vehicle coil 30 to approach the stop coil 20 of the parking stop 10, and thus battery charging by an electromagnetic induction technique can be smoothly performed. In an alternate embodiment, the vehicle coil 30 may be installed at a position adjacent to a front wheel of the electric vehicle 3 to allow the electric vehicle 3 to forwardly enter into the parking space and abut the parking stops 10.

In the stop coil 20 and the vehicle coil 30 of the above-described configuration, after the parking of the electric vehicle 3 has been properly completed, when an electromagnetic induction technique occurs, the charging circuit 40 converts AC current that is generated by an electromagnetic induction technique into a DC current to charge the storage battery 41.

A sensing unit 51 and a vehicle type sensor 53 are used for sensing a parking state of the electric vehicle 3 and a vehicle kind of the electric vehicle 3. As shown in FIG. 3, the sensing unit 51 senses that the tire 3b of the electric vehicle 3 contacts the parking stop 10, and the vehicle type sensor 53 senses the make, model, year, trim line of the electric vehicle 3 entering to the parking lot 1.

The vehicle type sensor 53 includes a Radio-Frequency IDentification (RFID) tag 53a that is installed on the electric vehicle 3 and transmits vehicle information to an RFID reader 53b that is installed in the parking lot 1. RFID reader 53b receives a signal from the RFID tag 53a, thereby receiving the vehicle information, such as vehicle make, vehicle model, model year and vehicle trim etc, of the electric vehicle 3 as well as perhaps the condition of the storage battery 41.

The RFID tag 53a can transmit wirelessly, information that is stored therein over a range of 10 feet to perhaps over 100 feet, and in the present exemplary embodiment, the RFID tag 53a transmits vehicle kind information of the electric vehicle 3. The RFID tag 53a includes a predetermined antenna and an integrated circuit. The integrated circuit stores information about the vehicle and transmits the information to the RFID reader 53b via the antenna.

The RFID reader 53b receives the vehicle information from the RFID tag 53a and transmits the vehicle information to the control unit 11. The control unit 11 reads a transmission signal of the RFID reader 53b and supplies a current to the stop coil 20 according to a vehicle type of the electric vehicle, thereby performing charging.

The sensing unit 51 is installed in the parking stop 10 and is installed as a limit to switch that senses access of the electric vehicle 3. In more detail, the sensing unit 51 protrudes from the parking stop 10 in a surface direction in which the tire 3b forms a contact. Therefore, in order to park the electric vehicle 3, when the tire 3b contacts with the parking stop 10, the electric vehicle 3 contacts the sensing unit 51 and thus the sensing unit 51 senses a parking completion state.

A parking completion signal that is sensed by the sensing unit 51 is transmitted to the control unit 11 that is installed in the parking lot 1. When the control unit 11 determines that parking of the electric vehicle 3 is properly completed through the sensing unit 51, the control unit 11 supplies power to the stop coil 20, thereby controlling the charging of the electric vehicle 3.

Hereinafter, a process of sensing a normal parking state of the electric vehicle 3 using the sensing unit 51 will be described in detail with reference to FIGS. 4A and 4B.

Figure 4A:
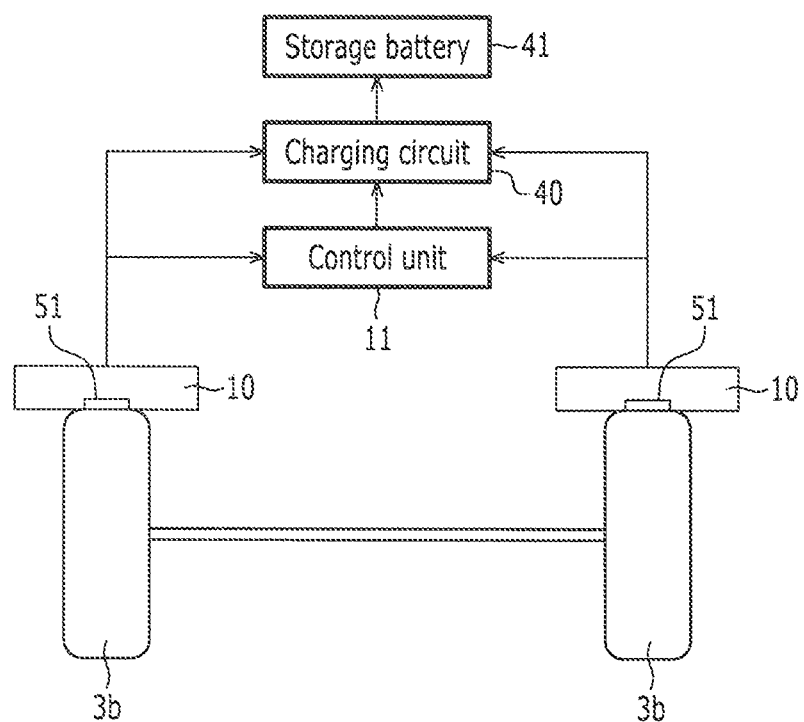
FIG. 4A is a diagram illustrating a state in which parking of an electric vehicle is properly completed when both tires of the electric vehicle properly contact with their respective parking stops, each of which include a sensing unit.
Figure 4B:
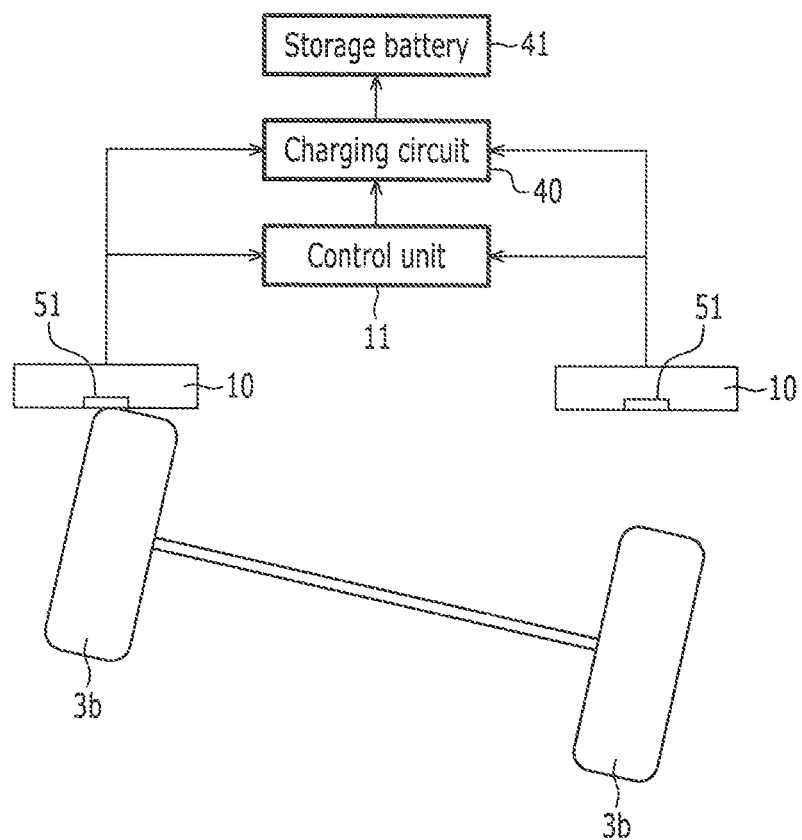
FIG. 4B is a diagram illustrating an improperly parked electric vehicle triggering an error state in which one tire of an electric vehicle does not properly contact with a corresponding parking stop.

Turning now to FIG. 4A, FIG. 4A is a diagram illustrating a correctly parked electric vehicle when both tires 3b of the electric vehicle properly contact corresponding parking stops 10 in which a pair of sensing units 51 are installed, and FIG. 4B is a diagram illustrating an improperly parked electric vehicle where one of the tires 3b does not properly contact the corresponding parking stop 10.

As shown in FIG. 4A, the sensing units 51 are each installed in a pair of parking stops 10. When a contact signal of the tire 3b occurs at both of a pair of sensing units 51 according to parking of the electric vehicle 3, the control unit 11 determines that the electric vehicle 3 is properly parked and begins to perform a charging operation of the electric vehicle 3.

Turning now to FIG. 4B, when at least one of the tires 3b does not contact a corresponding one of the sensing units 51, the control unit 11 determines this state as a parking error state of the electric vehicle 3 and does not begin to perform charging of the electric vehicle 3.

Figure 5:
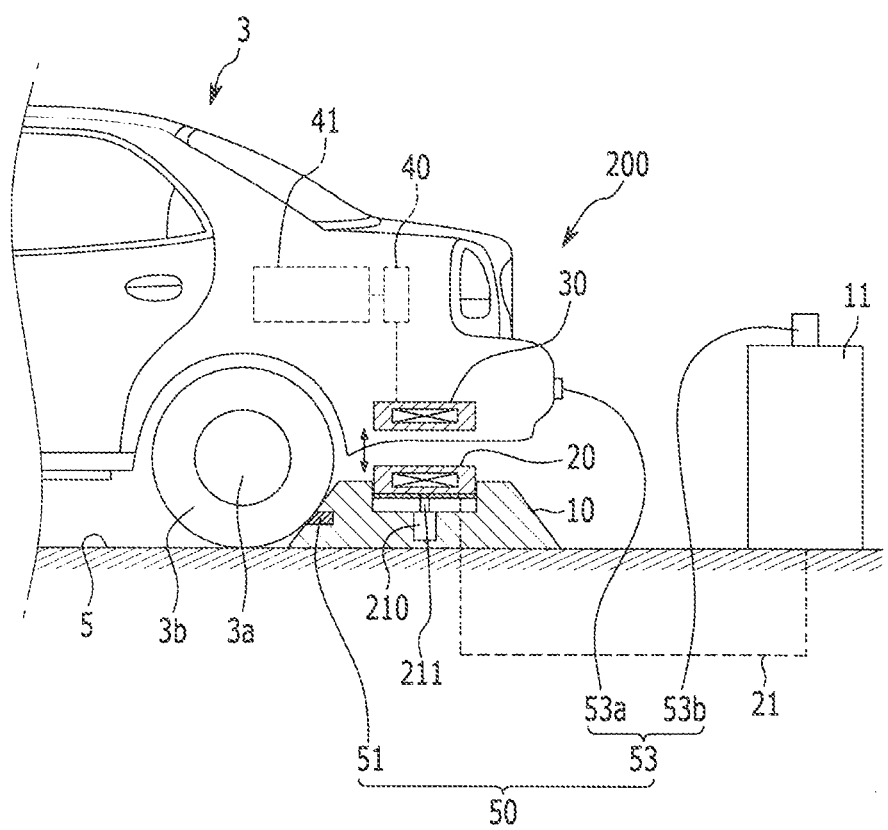
FIG. 5 is a side view illustrating a raised state of a stop coil in an electric vehicle charging apparatus according to a second exemplary embodiment of the present invention.

Turning now to FIG. 5, FIG. 5 is a side view illustrating an elevated state of a stop coil 20 of an electric vehicle charging apparatus 200 according to a second exemplary embodiment of the present invention. In FIG. 5, the same reference numerals as those of FIGS. 1 through 4 indicate the same members and the same functions. Hereinafter, a detailed description of the same reference numerals will be omitted.

As shown in FIG. 5, in an electric vehicle charging apparatus 200 according to the second exemplary embodiment of the present invention, an operation unit is included that is connected to a stop coil 20 to raise the stop coil 20. The operation unit is installed as a first cylinder member 210 on the inside of the parking stop 10.

The first cylinder member 210 is installed to raise the stop coil 20 from the inside of the parking stop 10. That is, a body of the first cylinder member 210 is installed on the inside of the parking stop 10, and the stop coil 20 is attached to a rod 211 of the first cylinder member 210. Therefore, the stop coil 20 can be selectively moved in a vertical or z-axis direction to the outside and then back inside of the parking stop 10 according to an operation of the first cylinder member 210.

When the stop coil 20 is moved according to operation of the first cylinder member 210, the stop coil 20 approaches the vehicle coil 30 and thus an electromagnetic induction technique can be more smoothly performed.

Figure 6:
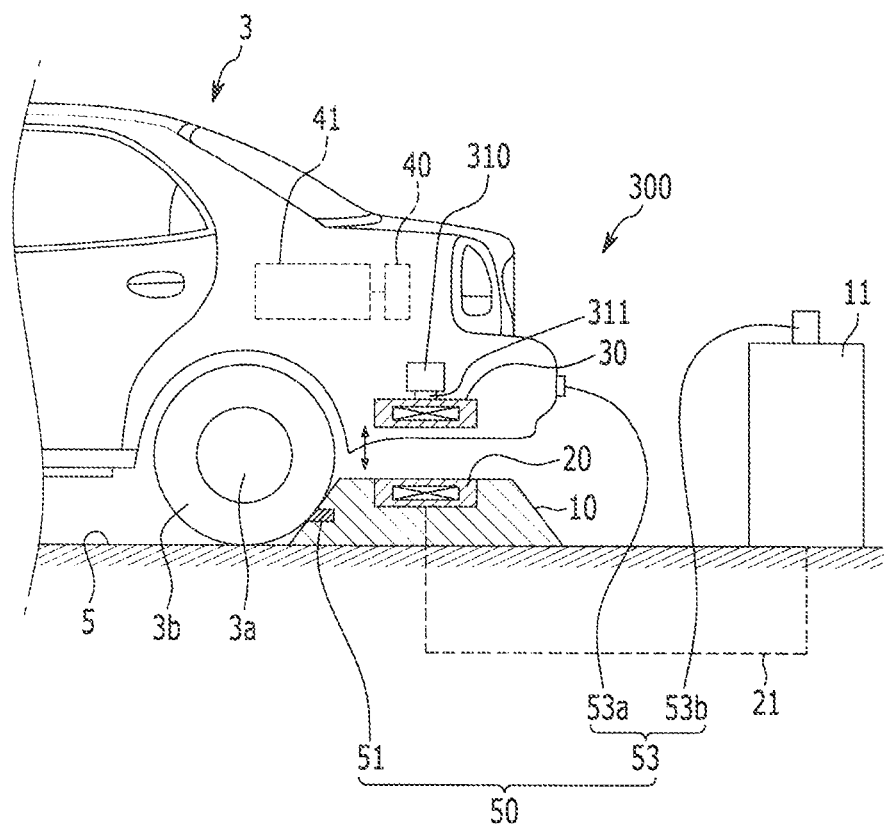
FIG. 6 is a side view illustrating a lowered state of a vehicle coil of an electric vehicle charging apparatus according to a third exemplary embodiment of the present invention.

Turning now to FIG. 6, FIG. 6 is a side view illustrating a lowered state of a vehicle coil 30 of an electric vehicle charging apparatus 300 according to a third exemplary embodiment of the present invention. In FIG. 6, the same reference numerals as those of FIGS. 1 through 5 indicate the same members and the same functions. Hereinafter, a detailed description of the same reference numerals will be omitted.

As shown in FIG. 6, in an electric vehicle charging apparatus 300 according to a third exemplary embodiment of the present invention, a second cylinder member 310 is installed on the inside of the electric vehicle 3. The second cylinder member 310 is installed to lower a vehicle coil 30 from the inside of an electric vehicle 3. That is, a body of the second cylinder member 310 is installed within the electric vehicle 3, and the vehicle coil 30 is attached to a rod 311 of the second cylinder member 310. Therefore, the vehicle coil 30 can be selectively lowered and raised out of and back into the electric vehicle 3 according to operation of the second cylinder member 310.

When the vehicle coil 30 moves downward towards the stop coil 20 according to operation of the second cylinder member 310, the vehicle coil 30 approaches the stop coil 20 and thus an electromagnetic induction technique can be more smoothly performed.

The first cylinder member 210 of the second exemplary embodiment or the second cylinder member 310 of the third exemplary embodiment are independently installed in the parking stop 10 or in the electric vehicle 3 in the second and third exemplary embodiments respectively. However, the first cylinder member 210 and the second cylinder member 310 may instead be used together in a single embodiment and still be within the scope of the present invention.

Figure 7A:
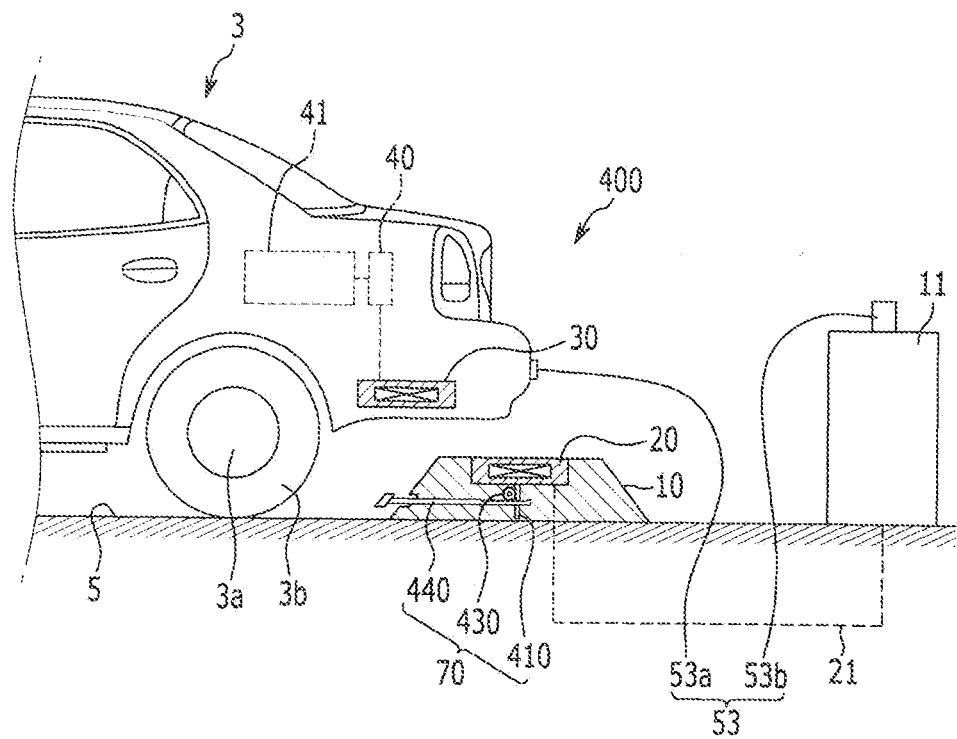
FIG. 7A is a side view illustrating a state of a stop coil of an electric vehicle charging apparatus prior to being raised according to a fourth exemplary embodiment of the present invention.
Figure 7B:
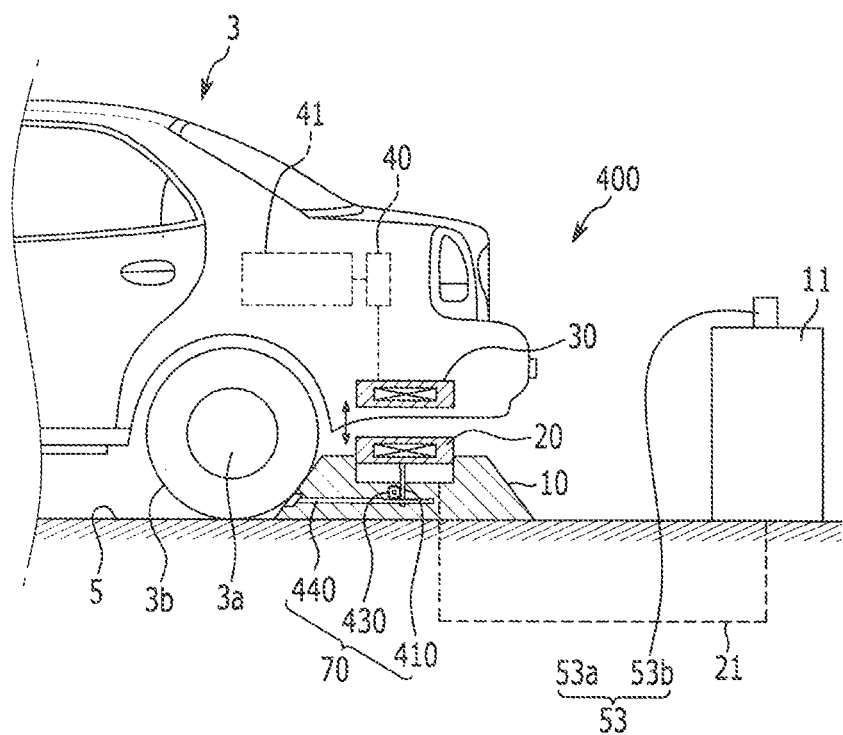
FIG. 7B is a side view illustrating a raised state of the stop coil of the electric vehicle charging apparatus according to the fourth exemplary embodiment of the present invention.
Figure 8:
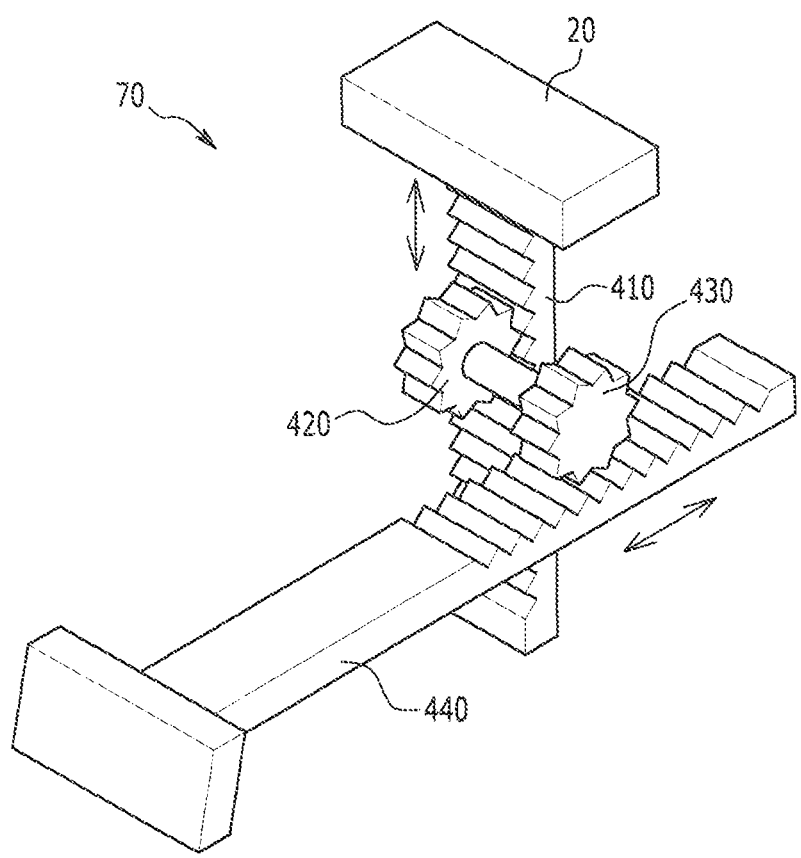
FIG. 8 is a perspective close-up view illustrating a gear state between first and second rack gears and first and second pinion gears of FIGS. 7A and 7B according to the fourth embodiment of the present invention.

Turning now to FIGS. 7A, 7B and 8, FIG. 7A is a side view illustrating a state before a stop coil 20 of an electric vehicle charging apparatus 400 is raised according to a fourth exemplary embodiment of the present invention, FIG. 7B is a side view illustrating a raised state of a stop coil 20 of an electric vehicle charging apparatus 400 according to a fourth exemplary embodiment of the present invention, and FIG. 8 is a perspective close-up view of the operation unit 70 of FIGS. 7A and 7B, including a gear state between first and second rack gears and first and second pinion gears of FIG. 7A.

In FIGS. 7A, 7B, and 8, the same reference numerals as that of FIGS. 1 through 6 indicate the same members and the same functions. Hereinafter, a detailed description of the same reference numerals will be omitted.

As shown in FIG. 7A, in an electric vehicle charging apparatus 400 according to a fourth exemplary embodiment of the present invention, the operation unit 70 is connected to a stop coil 20 to lift the stop coil 20.

The operation unit 70 includes a first rack gear 410 that selectively vertically moves the stop coil 20 outside and back inside the parking stop 10, first and second pinion gears 420 and 430 that transfer a translational driving force of second rack gear 440 to the first rack gear 410, and the second rack gear 440 that protrudes horizontally from a side surface of the parking stop 10, that receives a pressing force from tire 3b of electric vehicle 3 and provides a torque to the second and first pinion gears 430 and 420.

The first rack gear 410 has one end that is installed on the inside of the parking stop 10 to selectively raise stop coil 20 to protrude from an upper part of the parking stop 10. A lift driving force of the first rack gear 410 is driven by a pressing force of the second rack gear 440 to be described later, causing the first rack gear 410 to rise.

Second rack gear 440 engages with second pinion gear 430 to transfer a translational force of second rack gear 440 into a rotational driving force in second pinion gear 430. The first pinion gear 420 is attached to the second pinion gear 430 while being engaged with the first rack gear 410, so that the rotational driving force of the second pinion gear 430 can be translated into a translational (i.e., vertical) force of first rack gear 410.

The second rack gear 440 selectively protrudes from a side surface of the parking stop 10, i.e., a direction orthogonal to the first rack gear 410. An end portion of the second rack gear 440 receives a pressing force from the tire 3b which causes a lift driving force to the stop coil 20.

Hereinafter, operation of an electric vehicle charging apparatus 400 according to a fourth exemplary embodiment of the present invention will be described in detail. First, as shown in FIG. 7A, in a state in which the tire 3b does not contact the parking stop 10 or the second rack gear 440, an end portion of the second rack gear 440 protrudes from a side surface of the parking stop 10.

Next, as shown in FIG. 7B, when the tire 3b of the wheel 3a of the electric vehicle 3 contacts with the parking stop 10, the second rack gear 440 is pushed horizontally so that it resides entirely within the parking stop 10. As a result, the translational driving force of the second rack gear 440 transfers to a rotation driving force of the second pinion gear 430 due to a pressing force of the tire 3b. This causes the second pinion gear 430 to transfer a torque to the first pinion gear 420. Accordingly, the first pinion gear 420 transfers a rotational driving force into a translational driving force of first rack gear 410, causing the stop coil 20 rise and protrude from an upper part of the parking stop 10. As a result, the stop coil 20 and the vehicle coil 30 become adjacently disposed, and thus an electromagnetic induction technique can be smoothly performed.

Figure 9:
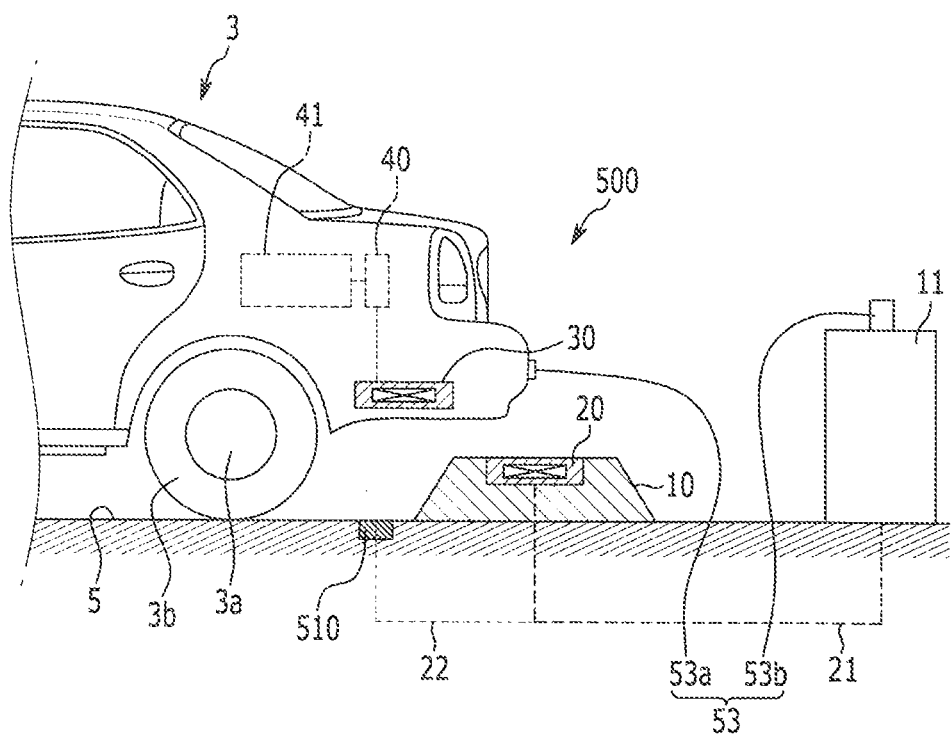
FIG. 9 is a side view illustrating an electric vehicle charging apparatus according to a fifth exemplary embodiment of the present invention.

Turning now to FIG. 9, FIG. 9 is a side view illustrating an electric vehicle charging apparatus 500 according to a fifth exemplary embodiment of the present invention. In FIG. 9, the same reference numerals as that of FIGS. 1 through 8 indicate the same members having the same functions. Hereinafter, a detailed description of the same reference numerals will be omitted.

As shown in FIG. 9, a sensing unit 510 of an electric vehicle charging apparatus 500 according to a fifth exemplary embodiment of the present invention in the form of a load sensor and is arranged on a surface 5 of a parking lot at a location that is adjacent to parking stop 10. Hereinafter, the sensing unit and the load sensor use the same reference numeral 510.

The load sensor 510 senses whether the electric vehicle 3 is properly parked. When both tires 3b of the electric vehicle 3 contact both parking stops 10 and when electric vehicle 3 is properly parked, each load sensor 510 is arranged directly underneath a corresponding rear tire 3b. Each load sensor 510 senses the weight of the electric vehicle 3 to ascertain whether the electrical vehicle is properly parked within a parking space.

Since the electric vehicle has two rear tires 3b and there are two stops 10 and two load sensors 510 for each parking space, control unit 11 determines that electric vehicle 3 is properly parked within a parking space when both load sensors 510 in a parking space simultaneously send a signal to the control unit that a load is being sensed. The control unit 11 is connected to load sensors 510 by wires 21 and 22, and when the control unit 11 determines that the electric vehicle 3 is properly parked within a parking space due to signals received from the load sensors 510, the control unit 11 begins to supply power to the stop coils 20, thereby commencing the charging process of the electric vehicle 3.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An electric vehicle charging apparatus to recharge an electric vehicle having a vehicle coil connected to a charging circuit connected to a storage battery, the electric vehicle charging apparatus comprising:

a parking stop arranged on a parking lot surface to receive contact from a tire of the vehicle while enabling the tire to continuously maintain contact with the parking lot surface, and to obstruct movement of the vehicle;

a stop coil arranged within the parking stop to generate an induced current in the vehicle coil when the vehicle coil is arranged in a vicinity of the stop coil; and an operation unit connected to the stop coil to move the stop coil away from the parking stop and toward the vehicle coil, the operation unit comprising:
- a first rack gear arranged within the parking stop to raise the stop coil above the parking stop and to lower the stop coil back within the parking stop;
- a first pinion gear that engages with the first rack gear;
- a second pinion gear that rotates together with the first pinion gear; and
- a second rack gear adapted to move horizontally upon application of force, adapted to protrude from a side of the parking stop and capable of being forced within the parking stop, the second rack gear being engaged with the second pinion gear.

2. The electric vehicle charging apparatus of claim 1, the operation unit comprising a first cylinder member that is arranged within the parking stop.

3. The electric vehicle charging apparatus of claim 1, further comprising a sensing unit that senses whether the electric vehicle is parked at a proper location for charging.

4. The electric vehicle charging apparatus of claim 3, the sensing unit being a limit switch that is installed on the parking stop to sense whether a tire of the electric vehicle forms contact therewith.

5. The electric vehicle charging apparatus of claim 3, the sensing unit being a load sensor that is installed on a surface of the parking lot at a location in a vicinity of the parking stop to sense a wheel load of the electric vehicle.

6. The electric vehicle charging apparatus of claim 1, further comprising a vehicle type sensor that senses a vehicle type of the electric vehicle entering into the parking lot.

7. The electric vehicle charging apparatus of claim 6, the vehicle type sensor comprising:
- a Radio-Frequency IDentification (RFID) tag that is installed on the electric vehicle to transmit vehicle information; and
- an RFID reader that is installed in the parking lot to receive a signal from the RFID tag that includes vehicle information of the electric vehicle.

* * * * *